(12) United States Patent
Lee

(10) Patent No.: US 7,831,565 B2
(45) Date of Patent: Nov. 9, 2010

(54) DELETION OF ROLLBACK SNAPSHOT PARTITION

(75) Inventor: Kent Lee, Ladera Ranch, CA (US)

(73) Assignee: Dot Hill Systems Corporation, Longmont, CO (US)

( * ) Notice: Subject to any disclaimer, the term of this patent is extended or adjusted under 35 U.S.C. 154(b) by 432 days.

(21) Appl. No.: 11/624,565

(22) Filed: Jan. 18, 2007

(65) Prior Publication Data

US 2008/0177957 A1  Jul. 24, 2008

(51) Int. Cl.
G06F 17/00 (2006.01)
G06F 7/00 (2006.01)
G06F 12/00 (2006.01)
G06F 13/00 (2006.01)
G06F 13/28 (2006.01)

(52) U.S. Cl. ....................... 707/649; 711/161
(58) Field of Classification Search .................. 707/649
See application file for complete search history.

(56) References Cited

U.S. PATENT DOCUMENTS

| | | |
|---|---|---|
| 5,551,046 A | 8/1996 | Mohan et al. |
| 5,778,189 A | 7/1998 | Kimura et al. |
| 5,812,843 A | 9/1998 | Yamazaki et al. |
| 5,963,962 A | 10/1999 | Hitz et al. |
| 6,073,209 A | 6/2000 | Bergsten et al. |
| 6,289,356 B1 | 9/2001 | Hitz et al. |
| 6,292,808 B1 | 9/2001 | Obermarck et al. |
| 6,341,341 B1 | 1/2002 | Grummon et al. |
| 6,548,634 B1 | 4/2003 | Balinger et al. |
| 6,557,079 B1 | 4/2003 | Mason, Jr. et al. |
| 6,594,744 B1 | 7/2003 | Humlicek et al. |
| 6,615,223 B1 | 9/2003 | Shih et al. |
| 6,771,843 B1 * | 8/2004 | Huber et al. .................. 382/305 |
| 6,907,512 B2 * | 6/2005 | Hill et al. ..................... 711/207 |
| 7,047,380 B2 | 5/2006 | Tormasov et al. |
| 7,050,457 B2 | 5/2006 | Erfurt et al. |
| 7,100,089 B1 | 8/2006 | Phelps |

(Continued)

FOREIGN PATENT DOCUMENTS

CA  2165912  6/1997

(Continued)

OTHER PUBLICATIONS

Written Opinion from the PCT dated Mar. 27, 2007 with regard to corresponding PCT Application No. PCT/US/06/32506, 10 pages.

(Continued)

*Primary Examiner*—Charles Rones
*Assistant Examiner*—Harold A Hotelling
(74) *Attorney, Agent, or Firm*—Thomas J. Lavan; Matthew Ryan Ellsworth

(57) ABSTRACT

A method, device, and system are provided for rollback of a master volume in a data storage system. More specifically, when a rollback is requested, snapshots that are involved in the rollback can be deleted during the rollback. This is accomplished by deleting the snapshot partition but not the actual snapshot data. Rather, the snapshot data is retained until the rollback is complete incase some of the snapshot data needs to be written to the master volume as part of the rollback.

20 Claims, 6 Drawing Sheets

U.S. PATENT DOCUMENTS

| | | |
|---|---|---|
| 7,165,156 B1 | 1/2007 | Cameron et al. |
| 7,191,304 B1 | 3/2007 | Cameron et al. |
| 7,194,550 B1 | 3/2007 | Chamdani et al. |
| 7,206,961 B1 | 4/2007 | Mutalik et al. |
| 7,243,157 B2 | 7/2007 | Levin et al. |
| 7,363,444 B2 | 4/2008 | Ji et al. |
| 7,373,366 B1 | 5/2008 | Chatterjee et al. |
| 7,526,640 B2 | 4/2009 | Bejarano et al. |
| 2001/0039629 A1 | 11/2001 | Feague et al. |
| 2002/0091670 A1 | 7/2002 | Hitz et al. |
| 2002/0112084 A1 | 8/2002 | Deen et al. |
| 2003/0154314 A1 | 8/2003 | Mason et al. |
| 2003/0158863 A1 | 8/2003 | Haskin et al. |
| 2003/0167380 A1 | 9/2003 | Green et al. |
| 2003/0188223 A1 | 10/2003 | Alexis et al. |
| 2003/0191745 A1 | 10/2003 | Jiang et al. |
| 2003/0229764 A1 | 12/2003 | Ohno et al. |
| 2004/0030727 A1 | 2/2004 | Armangau |
| 2004/0030846 A1 | 2/2004 | Armangau et al. |
| 2004/0030951 A1 | 2/2004 | Armangau |
| 2004/0054131 A1 | 3/2004 | Ballinger et al. |
| 2004/0093555 A1 | 5/2004 | Therrien et al. |
| 2004/0117567 A1 | 6/2004 | Lee et al. |
| 2004/0133718 A1 | 7/2004 | Kodama et al. |
| 2004/0172509 A1 | 9/2004 | Takeda et al. |
| 2004/0204071 A1 | 10/2004 | Bahl et al. |
| 2004/0260673 A1 | 12/2004 | Hitz et al. |
| 2004/0267836 A1 | 12/2004 | Armangau et al. |
| 2005/0004979 A1 | 1/2005 | Berkowitz et al. |
| 2005/0044088 A1 | 2/2005 | Lindsay et al. |
| 2005/0065985 A1 | 3/2005 | Tummala et al. |
| 2005/0066128 A1 | 3/2005 | Yagisawa et al. |
| 2005/0071393 A1 | 3/2005 | Ohno et al. |
| 2005/0122791 A1 | 6/2005 | Hajeck et al. |
| 2005/0166022 A1 | 7/2005 | Watanabe |
| 2005/0182910 A1 | 8/2005 | Stager et al. |
| 2005/0193180 A1 | 9/2005 | Fujibayashi |
| 2005/0198452 A1 | 9/2005 | Watanabe |
| 2005/0240635 A1 | 10/2005 | Kapoor et al. |
| 2005/0246397 A1 | 11/2005 | Edwards et al. |
| 2005/0246503 A1 | 11/2005 | Fair |
| 2006/0053139 A1 | 3/2006 | Marzinski et al. |
| 2006/0064541 A1 | 3/2006 | Kano et al. |
| 2006/0107006 A1 | 5/2006 | Green et al. |
| 2006/0155946 A1 | 7/2006 | Ji et al. |
| 2006/0212481 A1 | 9/2006 | Stacey et al. |
| 2006/0271604 A1 | 11/2006 | Shoens et al. |
| 2007/0038703 A1 | 2/2007 | Tendjoukian et al. |
| 2007/0055710 A1 | 3/2007 | Malkin et al. |
| 2007/0100808 A1 | 5/2007 | Balogh |
| 2007/0266066 A1 | 11/2007 | Kapoor et al. |
| 2007/0276885 A1 | 11/2007 | Valiyaparambil et al. |
| 2008/0082593 A1 | 4/2008 | Komarov et al. |

FOREIGN PATENT DOCUMENTS

| | | |
|---|---|---|
| EP | 1003103 | 5/2000 |
| WO | WO9429807 | 12/1994 |
| WO | WO 0250716 | 6/2002 |
| WO | WO2005111773 | 11/2005 |
| WO | WO2005111802 | 11/2005 |

OTHER PUBLICATIONS

International Search Report from the PCT dated Mar. 27, 2007 with regard to corresponding PCT Application No. PCT/US/06/32506, 3 pages.
International Preliminary Report on Patentability and Written Opinion from the PCT dated Mar. 20, 2008 with regard to corresponding PCT Application No. PCT/US/06/32506, 10 pages.
Notice of Allowance in U.S. Appl. No. 11/277,738, filed Mar. 20, 2008, 6 pages.
Office Action in Application in U.S. Appl. No. 11/277,738, filed Dec. 6, 2007, 9 pages.
Office Action in Application in U.S. Appl. No. 11/277,738, filed Jul. 31, 2007, 8 pages.
Office Action in Application in U.S. Appl. No. 11/277,738, filed Apr. 3, 2007, 14 pages.
International Search Report from the PCT dated Aug. 7, 2008 with regard to corresponding PCT Application No. PCT/US/08/57326, 2 pages.
Written Opinion from the PCT dated Aug. 7, 2008 with regard to corresponding PCT Application No. PCT/US/08/57326, 6 pages.
Official Action for U.S. Appl. No. 11/561,512, mailed Jun. 25, 2009.
Office Action in U.S. Appl. No. 11/561,512, filed Apr. 3, 2009, 11 pages.
Notice of Allowance for U.S. Appl. No. 11/560,174, mailed Feb. 9, 2009.
Official Action for U.S. Appl. No. 11/560,174, mailed Sep. 5, 2008.
Official Action for U.S. Appl. No. 11/624,524, mailed Dec. 11, 2008.
Official Action for U.S. Appl. No. 11/624,524, mailed Jun. 16 2009.
Official Action for U.S. Appl. No. 11/747,109, mailed Mar. 9, 2009.
Official Action for U.S. Appl. No. 11/734,081, mailed May 8, 2009.
Analysis from foreign associate dated Oct. 22, 2009 from 1st office action from Chinese patent office for application 200680032724.8.
Office Action in U.S. Appl. No. 11/561,512, filed Oct. 30, 2009, 9 pages.
Official Action for U.S. Appl. No. 11/747,109, mailed Sep. 21, 2009.
Official Action for U.S. Appl. No. 11/747,127, mailed Apr. 15, 2009.
Official Action for U.S. Appl. No. 11/747,127, mailed Oct. 6, 2009.
Official Action for U.S. Appl. No. 11/624,524, mailed Sep. 16, 2009.
Official Action for U.S. Appl. No. 11/624,524, mailed Jun. 16, 2009.
Official Action for U.S. Appl. No. 11/734,081, mailed Aug. 21, 2009.
Office Action in U.S. Appl. No. 11/561,512, filed Dec. 10, 2009.
Official Action for U.S. Appl. No. 11/747,127, mailed Jan. 6, 2010.
Notice of Allowance for U.S. Appl. No. 11/747,127, mailed May 14, 2010.
Notice of Allowance for U.S. Appl. No. 11/747,127, mailed Jun. 2, 2010.
Notice of Allowance for U.S. Appl. No. 11/747,127, mailed Jun. 15, 2010.
Official Action for U.S. Appl. No. 11/768,127, mailed Apr. 2, 2010.
Official Action for U.S. Appl. No. 11/768,127, mailed Jun. 1, 2010.
Notice of Allowance for U.S. Appl. No. 11/945,940, mailed Jun. 18, 2010.
International Preliminary Report on Patentability and Written Opinion from the PCT dated Oct. 22, 2009 with regard to corresponding PCT Application No. PCT/US/08/57326, 10 pages.
Official Action for U.S. Appl. No. 11/747,109, mailed Dec. 14, 2009.
Office Action in U.S. Appl. No. 11/561,512, Mar. 18, 2010.
Official Action for U.S. Appl. No. 11/945,940, mailed Mar. 5, 2010.
Official Action for U.S. Appl. No. 11/747,109, mailed Mar. 30, 2010.
Official Action for U.S. Appl. No. 11/624,524, mailed Jan. 26, 2010.
Notice of Allowance for U.S. Appl. No. 11/734,081, mailed Feb. 2, 2010.
Notice of Allowance for U.S. Appl. No. 11/734,081, mailed Mar. 10, 2010.
Office Action in U.S. Appl. No. 11/779,965, filed Jan. 29, 2010.
Examiner's answer in U.S. Appl. No. 11/561,512, Sep. 2, 2010.
Office Action in U.S. Appl. No. 11/779,965, Jun. 24, 2010.
Notice of Allowance for U.S. Appl. No. 11/945,940, mailed Jul. 13, 2010.
Notice of Allowance for U.S. Appl. No. 11/747,127, mailed Jul. 13, 2010.
Examiner's answer for U.S. Appl. No. 11/624,524, mailed Sep. 10, 2010.

* cited by examiner

DELETION OF ROLLBACK SNAPSHOT PARTITION

FIELD

The present invention is directed to data storage management. In particular, the present invention is directed to an improved snapshot rollback method, device, and apparatus.

BACKGROUND

The need to store digital files, documents, pictures, images and other data continues to increase rapidly. In connection with the electronic storage of data, various data storage systems have been devised for the rapid and secure storage of large amounts of data. Such systems may include one or a plurality of storage devices that are used in a coordinated fashion. Systems in which data can be distributed across multiple storage devices such that data will not be irretrievably lost if one of the storage devices (or in some cases, more than one storage device) fails are also available. Systems that coordinate operation of a number of individual storage devices can also provide improved data access and/or storage times. Examples of systems that can provide such advantages can be found in the various RAID (redundant array of independent disks) levels that have been developed. Whether implemented using one or a plurality of storage devices, the storage provided by a data storage system can be treated as one or more storage volumes.

In order to facilitate the availability of desired data, it is often advantageous to maintain different versions of a data storage volume or master volume. Indeed, data storage systems are available that can provide at least limited data archiving through backup facilities and/or snapshot facilities. The use of snapshot facilities greatly reduces the amount of storage space required for archiving large amounts of data typically associated with a master volume. A snapshot is a point-in-time representation of data on the master volume. For this reason, snapshots can be used to reset a master volume back to the point-in-time represented by the snapshot. This process of resetting a master volume back to a point-in-time represented by the snapshot is known as a "rollback" procedure. A rollback procedure is generally used to restore a master volume that has become corrupted or otherwise damaged.

In snapshot techniques, it is typically assumed that if the data in the master volume becomes corrupt or invalid, only the data that was added to or changed in the master volume since the formation of the snapshot is invalid. This is because the snapshot contains only the original data that was present in the master volume at the time the snapshot was formed, but which has since been deleted from the master volume or changed or replaced by new data within the master volume. In other words, data is only added to a snapshot in response to a change in the master volume. Otherwise, the data is maintained in the master volume. Hence, a rollback procedure returns the original data to the master volume and removes any new data added since the snapshot was taken and this data can be found either in the snapshot (if that data has been altered since the snapshot but before a subsequent snapshot), in a subsequent snapshot (if the data has been altered after the subsequent snapshot), or in the master volume (if the data has not been altered).

A problem with current rollback procedures is that snapshots cannot be deleted until after the rollback procedure is completed. This is because data associated with the point-in-time that the master volume is being rolled back to may be on a number of snapshots. Therefore, snapshots are generally locked until after the completion of a rollback procedure. The snapshots that are usually locked at a minimum include the rollback snapshot and the most recent snapshot at the time of rollback. This is inconvenient for a number of reasons. For example, a user may want to delete the snapshots from the data storage system because it is believed that those snapshots are also corrupted; however, the user has to wait until the rollback is completed. In some instances a rollback procedure can last several days. This means that the user will have to remember to delete the snapshots for a number of days before he/she is allowed to delete the snapshots. As another example, the user may wish to take a new snapshot of the master volume while the rollback is in progress. Unfortunately, memory space for snapshots can be limited, thus restricting the user's ability to take a new snapshot while the rollback is in progress. Therefore, the user has to wait until the rollback procedure is complete before a snapshot can be deleted to liberate memory for new snapshots.

SUMMARY

The present invention is directed to solving these and other problems and disadvantages of the prior art. In accordance with embodiments of the present invention, a service for executing a snapshot rollback is provided. In one embodiment, a method of snapshot rollback is provided. The method generally comprises the steps of receiving and executing a request to rollback a master volume to a first snapshot. Then, receiving a request to delete a second snapshot, which may contain data that will be copied to the master volume as a part of the rollback procedure. In response to receiving a request to delete the second snapshot, the second snapshot is separated into snapshot data and snapshot partition components such that during execution of the rollback request, the snapshot partition component of the second snapshot can be deleted. On the other hand, the snapshot data component of the second snapshot is maintained while the rollback of the master volume to the first snapshot is in progress. Deleting the snapshot partition component during rollback allows partition memory to be released for use by another snapshot if one is desired. Deleting a snapshot partition component during rollback may also free up a snapshot license for the user to create more snapshots. Additionally, in one embodiment, the snapshot data component can be automatically deleted after the rollback is completed, thus relieving a user of the burden of having to remember to delete the snapshot after the rollback is completed.

In another embodiment, a device for controlling a storage system is provided. The device generally comprises a rollback application that is capable of executing rollback instructions. More specifically, the rollback application can rollback a master volume to a point in time corresponding to a rollback snapshot. The rollback application may be equipped with a snapshot data separation function that is able to separate a snapshot into partition and data portions when a request is received to delete the snapshot. After the separation function has adequately separated the snapshot, the partition portion of the snapshot may be deleted while the rollback is occurring. The snapshot data portion is retained in memory until the rollback is completed.

Additional features and advantages of embodiments of the present invention will become more readily apparent from the following description, particularly when taken together with the accompanying drawings.

DETAILED DESCRIPTION

In accordance with embodiments of the present invention, a snapshot is a block level point-in-time representation of data on a master storage volume. The data on the master volume is essentially frozen in time at the instant that the snapshot is taken. Although data on the master volume may change as a result of write operations, the data represented by the snapshot will remain constant and frozen in time at the instant that the snapshot was taken. In order to preserve snapshot data, a repository (e.g., a backing store) is used to store data that is not otherwise represented in the master volume. Additionally, the backing store is used to store metadata for the master and snapshot volume. All data and metadata associated with the snapshot is typically stored in the backing store, although such storage on the backing store is not required. In accordance with embodiments of the present invention, data stored within the snapshot is stored in "chunks." A chunk is equivalent to a number of logical data blocks (LBAs). As a further optimization, data may also be stored at a subchunk level. A subchunk is a fixed size subset of a chunk.

Figure 1:
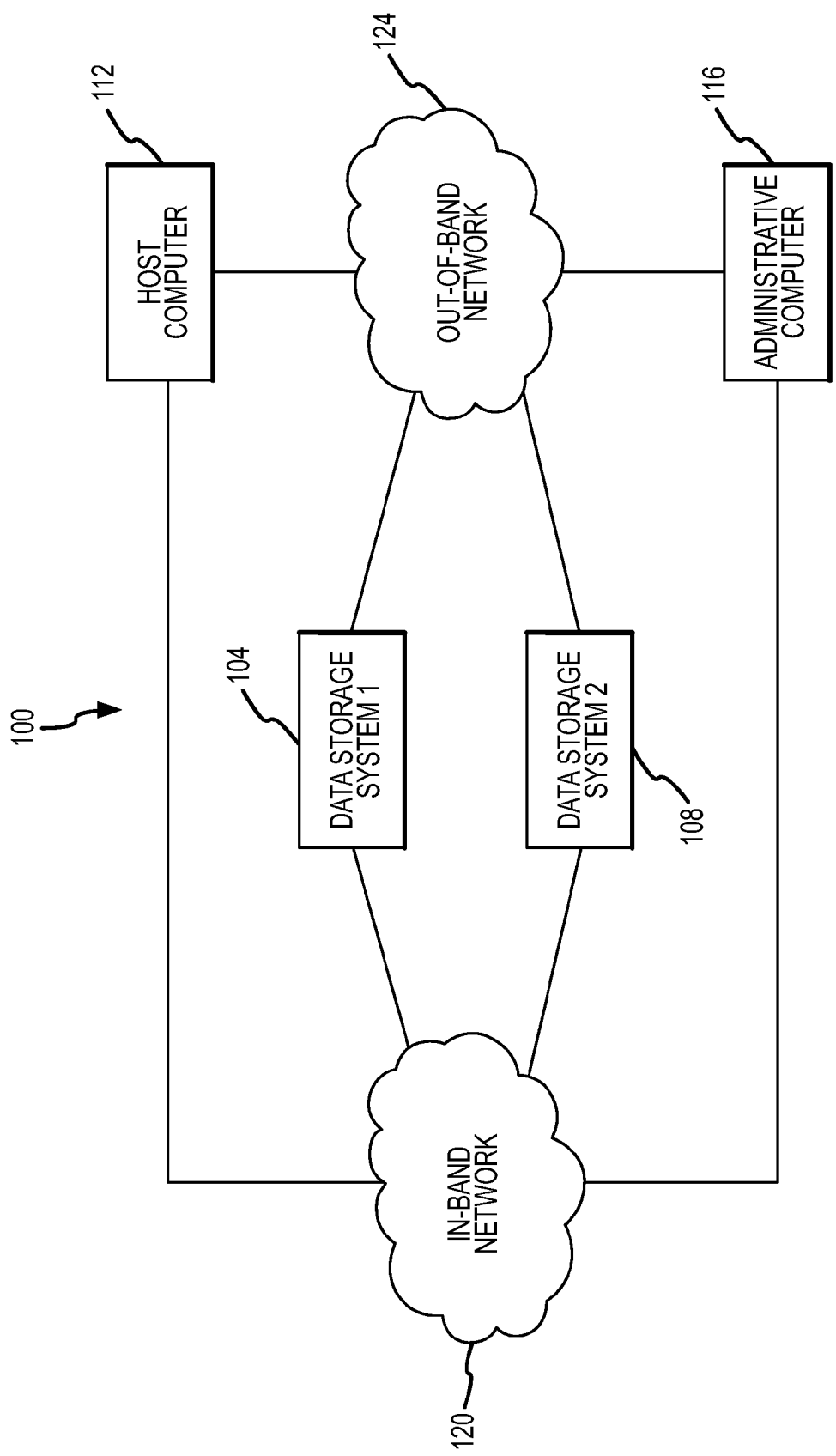
FIG. 1 is a functional block diagram depicting components of an electronic data system incorporating one or more data storage systems in accordance with embodiments of the present invention.

FIG. 1 is a block diagram depicting an electronic data system 100 in accordance with embodiments of the present invention incorporating a first data storage system 104. As illustrated, the system 100 may, but need not, also include a second data storage system 108. The electronic data system 100 may also include one or more host processors, computers, or computer systems 112. In addition, the electronic data system 100 may include or may be interconnected to an administrative computer 116. As will be appreciated by one of skill in the art after consideration of the present disclosure, embodiments of the present invention have application in association with single or multiple hosts 112 in storage area network (SAN) or direct connect environments.

The data storage systems 104, 108 are typically interconnected to one another through an in-band network 120. The in-band network 120 may also interconnect the data storage systems 104, 108 to a host computer 112 and/or an administrative computer 116. The electronic data system 100 may also include an out-of-band network 124 interconnecting some or all of the electronic data system 100 nodes 104, 108, 112 and/or 116. For example, one or more host computers 112 are connected to each data storage system 104, 108. For instance, a first data storage system 104 is connected to a second data storage system 108 across some distance by a Fibre Channel or a TCP/IP network 120, and each of these data storage systems 104, 108 is connected to a host computer 112 through an in-band 120 and/or an out-of-band 124 network.

The in-band or storage area network 120 generally functions to transport data between data storage systems 104 and/or 108 and host devices 112, and can be any data pipe capable of supporting multiple initiators and targets. Accordingly, examples of in-band networks 120 include Fibre Channel (FC), iSCSI, parallel SCSI, Ethernet, ESCON, Infiniband, Serial Attached SCSI (SAS), or FICON connections or networks, which may typically be characterized by an ability to transfer relatively large amounts of data at medium to high bandwidths. The out-of-band network 124 generally functions to support the transfer of communications and/or commands between various network nodes, such as data storage resource systems 104, 108, host computer 112, and/or administrative computers 116, although such data may also be transferred over the in-band communication network 120. Examples of an out-of-band communication network 124 include a local area network (LAN) or other transmission control protocol/Internet protocol (TCP/IP) network. In general, the out-of-band communication network 124 is characterized by an ability to interconnect disparate nodes or other devices through uniform user interfaces, such as a web browser. Furthermore, the out-of-band communication network 124 may provide the potential for globally or other widely distributed management of data storage systems 104, 108 via TCP/IP.

Every electronic data system node or computer 104, 108, 112 and 116, need not be interconnected to every other node or device through both the in-band network 120 and the out-of-band network 124. For example, no host computer 112 needs to be interconnected to any other host computer 112, data storage system 104, 108, or administrative computer 116 through the out-of-band communication network 124, although interconnections between a host computer 112 and other devices 104, 108, 116 through the out-of-band communication network 124 are not prohibited. As another example, an administrative computer 116 may be interconnected to at least one storage system 104 or 108 through the out-of-band communication network 124. An administrative computer 116 may also be interconnected to the in-band network 120 directly, although such an interconnection is not required. For example, instead of a direct connection, an administrative computer 116 may communicate with a controller of a data storage system 104, 108 using the in-band network 120.

In general, a host computer 112 exchanges data with one or more of the data storage systems 104, 108 in connection with the performance of the execution of application programming, whether that application programming concerns data management or otherwise. Furthermore, an electronic data system 100 may include multiple host computers 112. An administrative computer 116 may provide a user interface for controlling aspects of the operation of the storage systems 104, 108. The administrative computer 116 may be interconnected to the storage system 104, 108 directly, and/or through a bus or network 120 and/or 124. In accordance with still other embodiments of the present invention, an administrative computer 116 may be integrated with a host computer 112. In addition, multiple administrative computers 116 may be provided as part of the electronic data system 100. Furthermore, although two data storage systems 104, 108 are shown in FIG. 1, an electronic data system 100 may include more than two data storage systems or may include a single data storage system.

Figure 2:
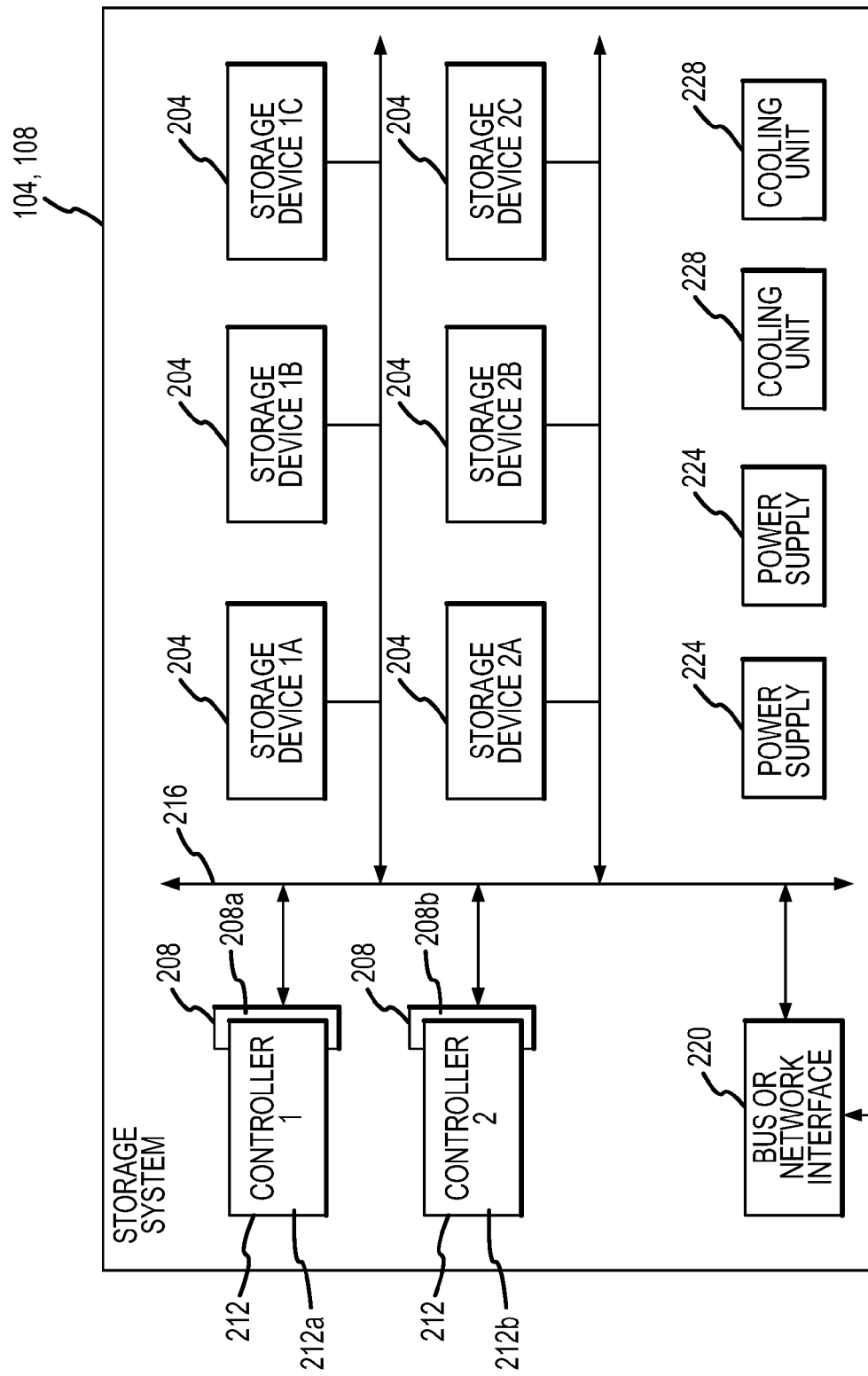
FIG. 2 is a block diagram depicting components of a data storage system in accordance with embodiments of the present invention.

FIG. 2 illustrates components that may be included in a data storage system 104, 108 in accordance with embodiments of the present invention. In general, the data storage system 104, 108 includes a number of storage devices 204. Examples of storage devices 204 include hard disk drives, such as serial advanced technology attachment (SATA), small computer system interface (SCSI), SAS, Fibre Channel (FC), or parallel advanced technology attached (PATA) hard disk drives. Other examples of storage devices 204 include magnetic tape storage devices, optical storage devices or solid-state disk devices. Furthermore, although a number of storage devices 204 are illustrated, it should be appreciated that embodiments of the present invention are not limited to any particular number of storage devices 204, and that a lesser or greater number of storage devices 204 may be provided as part of a data storage system 104. As can be appreciated by one of skill in the art, one or more arrays and/or array partitions, hereinafter referred to as Logical Unit Numbers (LUNs) comprising a storage volume, may be established on the data storage devices 204. As can be further appreciated by one of skill in the art, a LUN may be implemented in accordance with any one of the various RAID levels or other arrangements for storing data on one or more storage devices 104. As can also be appreciated by one of skill in the art, the storage devices 204 may contain data comprising a master storage volume, which may correspond to a LUN, in addition to one or more snapshots of the master storage volume taken at different times. As can further be appreciated by one of skill in the art, snapshots may comprise metadata and data stored in a backing store on the storage devices 204. In one embodiment, the snapshots may be mapped to the LUNs and stored on a backing store. However, the backing store, which also occupies an array and/or array partition, does not have a LUN number assigned to it, thus making the backing store invisible to a host computer 112 and/or administrative computer 116. Furthermore, a permanent partition storage area may be allocated on the array and/or array partition. The partition storage area is used to store snapshot partitions through which the snapshot data is made directly accessible by a controller 212.

A data storage system 104, 108 in accordance with embodiments of the present invention may be provided with a first controller slot 208a. In addition, other embodiments may include additional controller slots, such as a second controller slot 208b. As can be appreciated by one of skill in the art, a controller slot 208 may comprise a connection or set of connections to enable a controller 212 to be operably interconnected to other components of the data storage system 104, 108. Furthermore, a data storage system 104, 108 in accordance with embodiments of the present invention includes at least one controller 212a. For example, while the data storage system 104, 108 is operated in a single controller, non-failover mode, the data storage system 104, 108 may include exactly one controller 212. A data storage system 104, 108 in accordance with other embodiments of the present invention may be operated in a dual redundant active-active controller mode by providing a second controller 212b. When a second controller 212b is used in addition to a first controller 212a, the second controller slot 208b receives the second controller 212b. As can be appreciated by one of skill in the art, the provision of two controllers, 212a to 212b, permits data to be mirrored between the controllers 212a-212b, providing redundant active-active controller operation.

One or more busses or channels 216 are generally provided to interconnect a controller or controllers 212 through the associated controller slot or slots 208 to the storage devices 204. Furthermore, while illustrated as a single shared bus or channel 216, it can be appreciated that a number of dedicated and/or shared buses or channels may be provided. Additional components that may be included in a data storage system 104, 108 include one or more power supplies 224 and one or more cooling units 228. In addition, a bus or network interface 220 may be provided to interconnect the data storage system 104, 108 to the bus or network 112, and/or to a host computer 108 or administrative computer 116.

Although illustrated as a complete RAID system in FIG. 2, it should be appreciated that the data storage system 104, 108 can comprise one or more storage volumes implemented in various other ways. For example, the data storage system 104, 108 may comprise a hard disk drive or other storage device 204 connected or associated with a server or a general-purpose computer. As further examples, the storage system 104 may comprise a Just a Bunch of Disks (JBOD) system or a Switched Bunch of Disks (SBOD) system, where the algorithms described herein are performed by an external host computer 112.

Figure 3:
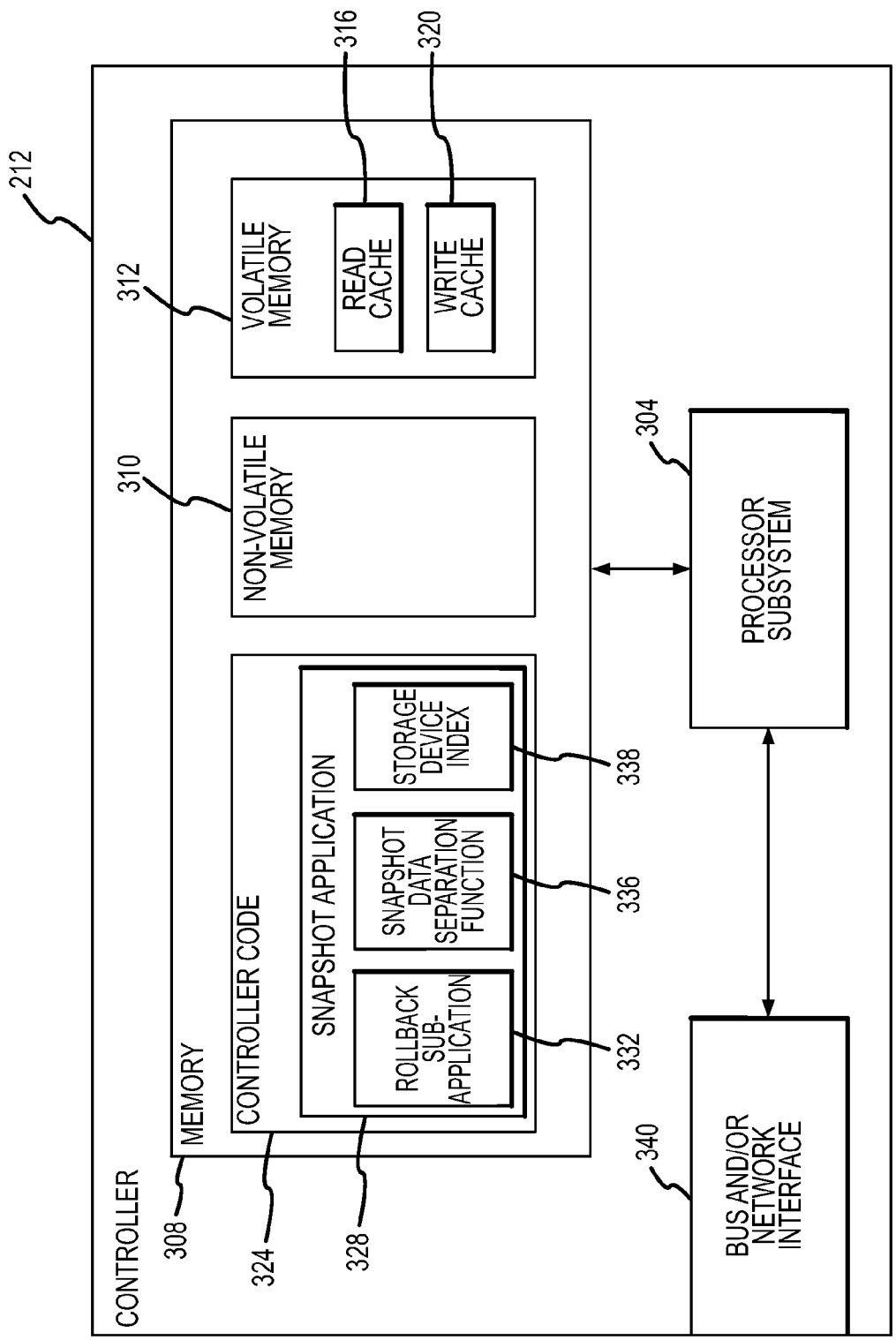
FIG. 3 is a block diagram depicting components of a storage controller in accordance with embodiments of the present invention.

FIG. 3 illustrates aspects of a storage controller 212 in accordance with embodiments of the present invention. In general, a storage controller 212 includes a processor subsystem 304 capable of executing instructions for performing, implementing and or controlling various controller 212 functions. Such instructions may include instructions for implementing aspects of a rollback method and apparatus. Furthermore, such instructions may be stored as software and/or firmware. As can be appreciated by one of skill in the art, operations concerning the generation of parity data or other operations may be performed using one or more hardwired and/or programmable logic circuits provided as part of the processor subsystem 304. Accordingly, the processor subsystem 304 may be implemented as a number of discrete components, such as one or more programmable processors in combination with one or more logic circuits. Processor subsystem 304 may also include or be implemented as one or more integrated devices or processors. For example a processor subsystem may comprise a complex programmable logic device (CPLD).

A controller 212 also generally includes memory 308. The memory 308 is not specifically limited to memory of any particular type. For example, the memory 308 may comprise a solid-state memory device or a number of solid-state memory devices. In addition, the memory 308 may include separate non-volatile memory 310 and volatile memory 312 portions. As can be appreciated by one of skill in the art, the memory 308 may include a write cache 316 and a read cache 320 that are provided as part of the volatile memory 312 portion of the memory 308, although other arrangements are possible. By providing caches 316, 320, a storage controller 212 can improve the speed of input/output (IO) operations between a host 108 and the data storage devices 204 comprising an array or array partition. Examples of volatile memory 312 include DRAM and SDRAM.

As an example, the non-volatile memory 310 may be used to store data that was written to the write cache 320 in the event of a power outage affecting the data storage system 104. The non-volatile memory portion 310 of the storage controller memory 308 may include any type of data memory device that is capable of retaining data without requiring power from an external source. Examples of non-volatile memory 310 include, but are not limited to, compact flash or other standardized non-volatile memory devices.

The memory 308 also includes portions of the memory 308 comprising a region that provides storage for controller code 324. The controller code 324 may comprise a number of components, including a snapshot application 328 comprising instructions for executing commands received from a host 112 related to creating, deleting, and manipulating snapshots as described herein. The snapshot application 328 may comprise a means for deleting a snapshot and may itself include or be associated with a number of sub-applications. One example of such a sub-application that may be included in the snapshot application 328 includes, but is not limited to, a rollback sub-application 332 and a snapshot data separation function 336. The rollback sub-application 332 generally constitutes a means for executing a rollback of a master volume. The rollback sub-application 332 may contain instructions for executing a rollback of a master volume to a point in time associated with a snapshot. As can be appreciated, the controller code 324 may be stored in any type of memory including non-volatile 310 or volatile memory 312. In a preferred embodiment, the controller code 324 is maintained in a non-volatile type of memory.

In accordance with embodiments of the present invention, the rollback sub-application 332 is characterized by the ability to delete a snapshot while rollback is in progress. To facilitate the deletion of snapshots during rollback, the rollback sub-application 332 employs the snapshot data separation function 336. In response to receiving a request to delete a snapshot during a rollback procedure, the snapshot data separation function 336 is operable to separate a snapshot into a snapshot data component and a snapshot partition component. The snapshot data component comprises the actual data of the snapshot. The snapshot data component is generally stored in chunks on the backing store. The snapshot partition component provides the controller 212 direct access to the snapshot data component. After the snapshot data separation function 336 has separated the snapshot into the data and partition components, the partition component can be deleted by the rollback sub-application 332 while the rollback is in progress.

Snapshot partitions are generally stored in a permanent partition storage location. The partition storage may be located on the array the partition is on. However, the controller 212 may also maintain a local copy of the partition for fast access. The local copy may be maintained on the non-volatile memory 310 and/or the volatile memory 312, but is preferably stored on the volatile memory 312.

In addition to the rollback sub-application 332, the snapshot application 328 may further include a storage device index 338. The storage device index 338 is used to store an index or address for the control block of each snapshot. As a snapshot is created the storage device index 338 is updated. The control block of each snapshot is a data structure on the storage device 204 that is used to configure and manage metadata for snapshots. The storage device index 338 provides a way for the rollback sub-application 332 to access the control block for a given snapshot in the absence of a snapshot partition. Once a control block has been located for a given snapshot, the control block can be used to locate the snapshot data directly since the control block is not deleted until the snapshot data is deleted. The storage device index 338 provides the rollback sub-application 332 an indirect way of locating snapshot data in the absence of a snapshot partition. In accordance with embodiments of the present invention, part of separating a snapshot into data and partition components would be to replace a locating key referring to the control block from the partition index to the storage device index when the partition for a given snapshot is deleted.

A storage controller 212 may additionally include other components. For example, a bus and/or network interface 340 may be provided for operably interconnecting the storage controller 212 to the remainder of the data storage system 104, 108 for example through a controller slot 208 and a bus or channel 216. Furthermore, the interface 340 may be configured to facilitate removal or replacement of the storage controller 212 in a controller slot 208 as a field replaceable unit (FRU). In addition, integral signal and power channels may be provided for interconnecting the various components of the storage controller 212 to one another.

Figure 4:
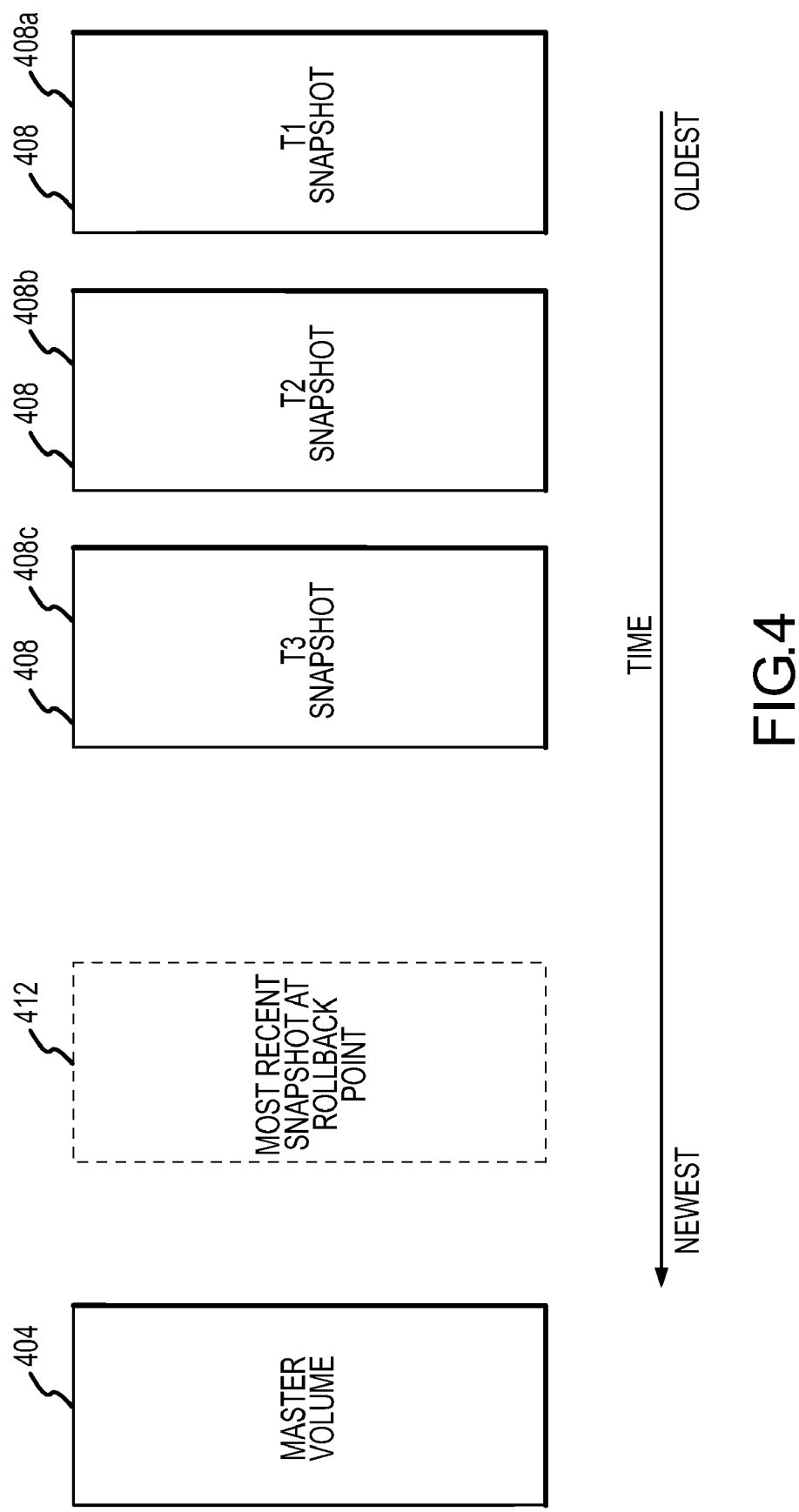
FIG. 4 is a block diagram depicting a number snapshots of a master storage volume in accordance with embodiments of the present invention.

FIG. 4 is a block diagram depicting a number of snapshots 408 taken of a master volume 404 over time. Each snapshot 408 generally comprises a partition component and a data component. The first snapshot 408a corresponds to the oldest point-in-time picture of the master volume 404. The second snapshot 408b corresponds to the next point-in-time picture of the master volume 404. That is the second snapshot 408b was taken after the first snapshot 408a. Likewise, the third snapshot 408c succeeds the second snapshot 408b in time. The master volume 404 may be rolled back to any of the existing snapshots 408. Although three snapshots 408 are depicted in FIG. 4, one of skill in the art can appreciate that a greater or lesser number of snapshots may exist for a given master volume 404.

If a rollback command is received, the rollback sub-application 332 will identify the most recent snapshot existing at the time rollback is requested. The identified snapshot is referred to herein as the most recent snapshot at rollback point 412. The most recent snapshot at rollback point 412 is the most current snapshot as compared to other snapshots 408. In one embodiment, the most recent snapshot at rollback point 412 is created in response to receiving the rollback request. Alternatively, the snapshot 412 may have already existed in the backing store. The most recent snapshot at rollback point 412 may be created in response to receiving a user request to create such a snapshot. This embodiment preserves the master volume 404 state before rollback starts. In another embodiment, the most recent snapshot of the master volume 404 before rollback starts will be used as the most recent snapshot at rollback point 412 to support rollforward capabilities. In other words, automatically creating the most recent snapshot at rollback point 412 may allow the user to rollback to the first snapshot 408a and then be able to later rollback to a newer snapshot, such as the third snapshot 408c, which may have been taken after the first snapshot 408a but before the rollback to the first snapshot 408a. The entire master volume 404 is then written to the most recent snapshot at rollback point 412 so that the master volume 404 can be completely erased or flushed in preparation for rollback.

In accordance with embodiments of the present invention, when the first snapshot 408a is created, partition space is allocated for the snapshot but no data is written to the snapshot. Snapshot data is only created in response to a change in the master volume 404. When data on the master volume 404 is changed in any way (e.g., an existing file is rewritten or deleted or a new file is created), the data block to be changed on the master volume 404 is copied to the first snapshot 408a before the data block is changed. This process only occurs once at the first time the block is changed. For subsequent block changes, the data is not copied to the snapshot, since the snapshot is meant to represent a point-in-time picture of the master volume 404. Waiting until changes occur to write data to the first snapshot 408a allows the first snapshot 408a to occupy much less disk space than the entire master volume 404. More specifically, ill one embodiment, the reported size of the snapshot 408 is always the same as the size of the master volume 404 at the time the master volume 404 is snapped. However, the internal data space allocated on the backing store to store the snapshot data is less than the reported size and would only be comparable to the master volume 404 if the entirety of the master volume 404 is changed before another snapshot 408 is taken.

A consequence of waiting until changes occur to write data to the first snapshot 408*a* is that data corresponding to a point-in-time associated with the first snapshot 408*a* may not completely reside on the first snapshot 408*a*. For example, data that is not changed on the master volume 404 until after the second snapshot 408*b* is taken will be written to the second snapshot 408*b* after the change occurs even though such data is also associated with the point-in-time that the first snapshot 408*a* was taken. Moreover, data for the first snapshot 408*a* may also reside on the third snapshot 408*c* or any subsequent snapshots. Also, if the data on the master volume 404 did not change since the first snapshot 408*a* was taken, the data for the first snapshot 408*a* will be found on the master volume 404. Therefore, during rollback, the rollback sub-application 332 will likely need to search all of the snapshots 408 up to the most recent snapshot 408 at the start of the rollback.

Figure 5:
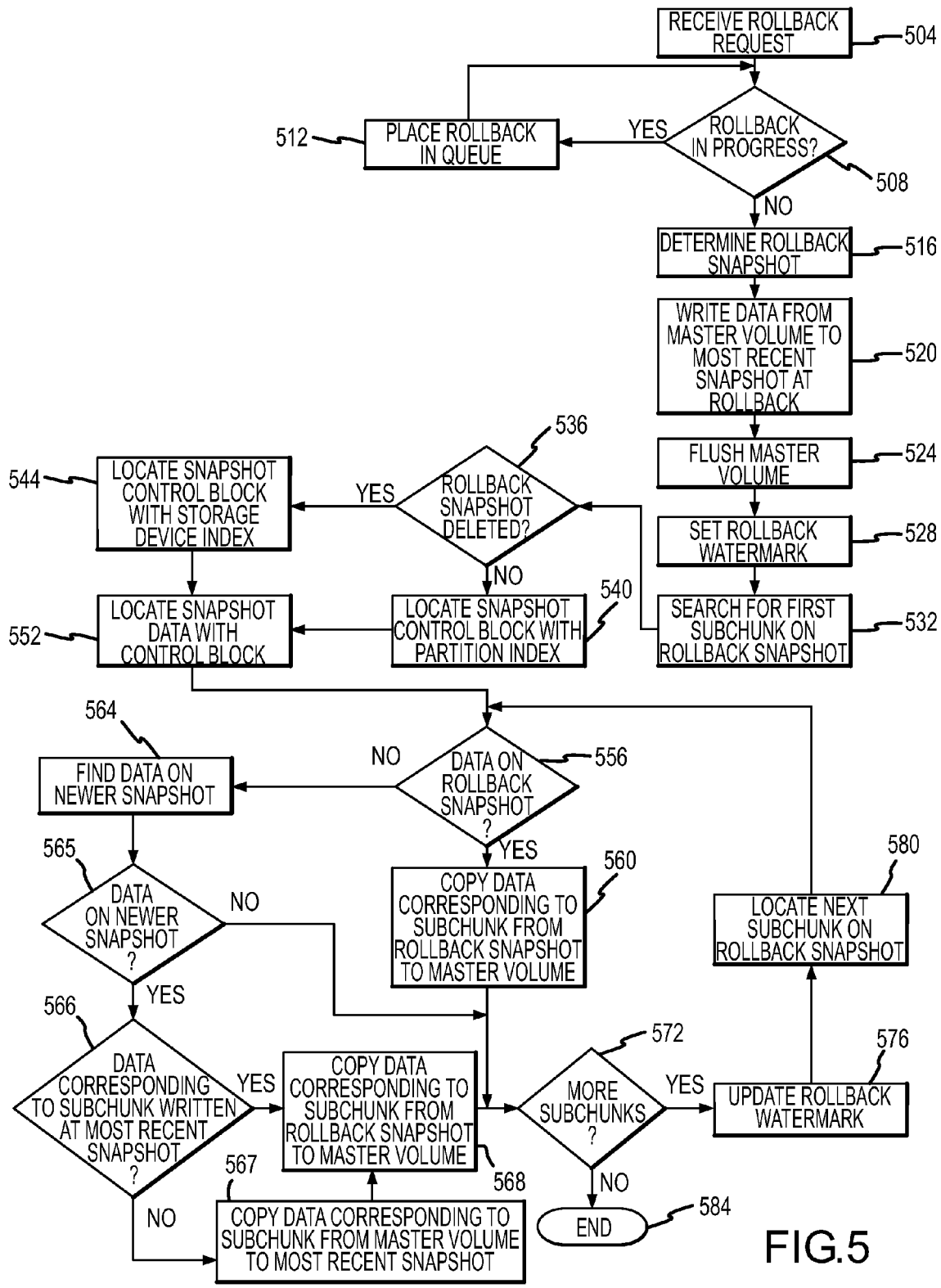
FIG. 5 is a flow chart depicting aspects of snapshot rollback in accordance with embodiments of the present invention.

FIG. 5 is a flow diagram depicting a method of executing a snapshot rollback command in accordance with at least some embodiments of the present invention. The method is initiated when a rollback request for the master volume 404 is received by the controller 212 (step 504). Typically, either a host computer 112 or an administrative computer 116 sends the request for rollback to the controller 212. A rollback is usually requested because data on the master volume 404 has become corrupted or is otherwise unusable.

A request for rollback is then processed by the rollback sub-application 332 which begins by determining if another rollback is currently in progress (step 508). In some embodiments, only one rollback can be processed at a time and therefore if a rollback is currently in progress. In this embodiment, if the rollback sub-application 332 determines that a rollback is already in progress, then the requested rollback is placed in a queue to await the completion of the rollback in progress (step 512). However, in other embodiments, more than one rollback may be processed at a time in which case the request for a rollback is sufficient to begin the rollback.

Once it is determined that the rollback can proceed, the rollback sub-application 332 identifies the rollback snapshot (step 516). As noted above, each snapshot 408 corresponds to a different point-in-time representation of the master volume 404. Therefore, when a user identifies a point-in-time that they would like to have the master volume 404 rolled back to, the rollback sub-application 332 identifies the corresponding snapshot 408 as the rollback snapshot. For example, if the user requests rollback of the master volume 404 to its oldest point, then the first snapshot 408*a* is identified as the rollback snapshot. As can be appreciated by one of skill in the art, the rollback snapshot may correspond to any one of the snapshots 408 of the master volume 404.

After the rollback snapshot has been identified, the rollback sub-application 332 writes data from the master volume 404 to the most recent snapshot at rollback point 412 (step 520). Following the completion of writing the master volume 404 to the most recent snapshot at rollback point 412 the master volume 404 is flushed and all of the data on the master volume 404 is deleted (step 524). Before flushing a specified master volume 404 LBA range, the master data on the storage device 204 or the same LBA range is moved to the most recent snapshot 408 for preservation if the data has not been changed (e.g., the data has not been written to any snapshot 408). The most recent snapshot 408 in this case will become the most recent snapshot at rollback point 412 when the rollback process starts. The master volume 404 is flushed in preparation to receive the data from the rollback snapshot. Flushing the master volume 404 comprises writing contents of the master cache to the master disk and clearing all of the master cache. The reason this is done before rollback starts is to prevent the disk and cache from becoming out of sync with one another. Thereafter, a rollback watermark is set at the first subchunk of the rollback snapshot (step 528). The rollback watermark is used as a progress indicator for the rollback processing. In one embodiment, any subchunk below the watermark is identified as having been successfully moved from the rollback snapshot to the master volume 404. On the other hand, anything above the watermark is identified as not yet moved.

After the rollback watermark is set, the rollback sub-application 332 searches for the data that should reside on the first subchunk (i e, the data from the first Logical Block Address (LBA) of the master volume 404) of the rollback snapshot (step 532). As noted above, any snapshot 408 may be deleted during rollback, including the rollback snapshot. Therefore, the rollback sub-application 332 determines if the rollback snapshot has been deleted (step 536). If the rollback snapshot has not been deleted, then the rollback sub-application 332 locates the snapshot in a normal fashion by locating the control block via the snapshot partition index (step 540).

However, if the rollback snapshot has been deleted during the rollback, then the rollback snapshot partition will no longer be available to the rollback sub-application 332 in the snapshot partition index. Under these circumstances, the rollback sub-application 332 can reference the internal storage device index 338 created by the snapshot application 328 for any snapshot 408 in order to locate the snapshot control block (step 544). Of course, the rollback sub-application 332 can find the control blocks for any other deleted snapshot using the storage device index 338. After the appropriate control block has been located either via partition data in the partition index or via the storage device index 338, the rollback sub-application 332 uses the metadata from the control block to locate the snapshot data (step 552).

Once the rollback sub-application 332 locates the rollback snapshot either by using the snapshot partition or by using metadata stored in association with the storage device index 338, the rollback sub-application 332 searches the first subchunk of the rollback snapshot to determine if there is data on the first subchunk (step 556). If there is data stored on the first subchunk (i.e., the first subchunk does not have a null value), then the rollback sub-application 332 proceeds by copying the data from the first subchunk of the rollback snapshot to the master volume 404 (step 560). Also, if data is on the rollback snapshot 408 but the corresponding subchunk on the most recent snapshot at rollback point is not written, then data for that subchunk is written from the master volume 404 to the most recent snapshot at rollback point 412 prior to copying the snapshot data from the first subchunk to the master volume 404. However, as noted above, there may be certain circumstances where data that should reside on the first subchunk of the rollback snapshot is not stored on the first subchunk of the rollback snapshot. The data associated with the point-in-time of the rollback snapshot may be stored on another snapshot 408 or even on the most recent snapshot at rollback point 412. Under these circumstances, the rollback sub-application 332 begins systematically searching each snapshot 408 that was taken after the rollback snapshot, possibly including the most recent snapshot at rollback point 412, until the data for the first subchunk is located (step 564). The subsequent snapshots may be searched systematically or in an alternative embodiment the rollback snapshot may contain metadata pointing to the snapshot that contains the actual data. The rollback sub-application 332 may also locate subsequent snapshots using partition data, if it is available, or the storage device index 338 as described above. Based on the find/searching step, it is determined whether the data is on a newer snapshot (step 565).

In step 566, the rollback sub-application 332 determines whether the data is on the most recent snapshot at rollback point 412. If the data was not found on the most recent snapshot at rollback point 412 (i.e., the data is on a subsequent snapshot 408 but not the most recent snapshot at rollback point 412), then the rollback sub-application 332 copies the data from the subchunk on the master volume 404 to the most recent snapshot at rollback point 412 (step 567). Thereafter, the data from the subchunk is copied from the rollback snapshot 408 to the master volume 404 (step 568). However, if the data was on the most recent snapshot at rollback point 412, then there is no need to write the data from the master volume 404 to the most recent snapshot at rollback point 412 because the data is already on the most recent snapshot, so the method goes directly to copying the data from the rollback snapshot 408 to the master volume 404.

Of course, if the data cannot be found on any snapshot 408, 412, then the snapshot data is on the master volume 404 and has not changed since any snapshot has been taken. This means that the data does not need to be copied to the master volume 404 because it already resides there. In this case, the method skips from step 565 to step 572, where it is determined if there are more subchunks to be copied to the master volume 404.

After the first subchunk of data has been written to the master volume 404 or was found on the master volume 404 because it was not changed since a snapshot 408, 412 was taken, the rollback sub-application 332 determines if there are more subchunks on the rollback snapshot that need to be written to the master volume 404 (step 572). When a snapshot is created it may contain data that indicates how many subchunks will be required if the snapshot is filled. In other words, since data is not written to a snapshot 408 until a change to the master volume 404 occurs, data associated with a rollback snapshot may not reside on that snapshot. Therefore, the rollback sub-application 332 needs to determine if it must continue looking for snapshot data even in the absence of snapshot data on the rollback snapshot. To this end, the rollback snapshot may contain data that indicates the maximum possible number of subchunks that the rollback sub-application 332 will need to search for, either on the rollback snapshot or other subsequent snapshots.

If the rollback sub-application 332 determines that more subchunks need to be written to the master volume 404, the rollback sub-application 332 proceeds to update the watermark to indicate the progress of the rollback procedure (step 576). After the watermark has been updated, the rollback sub-application 332 proceeds by attempting to locate the data for the next subchunk on the rollback snapshot (step 580). This step is similar to step 532 except that the rollback sub-application 332 is looking for data in a different subchunk of the rollback snapshot. The data may be found either in association with the rollback snapshot or in association with another subsequent snapshot. After step 580, the method returns to step 556.

After all of the subchunks corresponding to the rollback snapshot have been copied to the master volume 404, the method ends and the rollback is completed (step 584). In accordance with embodiments of the present invention, a snapshot 408 may be deleted any time after the rollback request is received. For example, snapshots 408 may be deleted while the master volume 404 is being flushed (e.g., once the rollback start request is completed, the snapshot delete request can be processed). Alternatively, snapshots 408 may be deleted while subchunks of data are being transferred from a snapshot 408 to a master volume 404.

Figure 6:
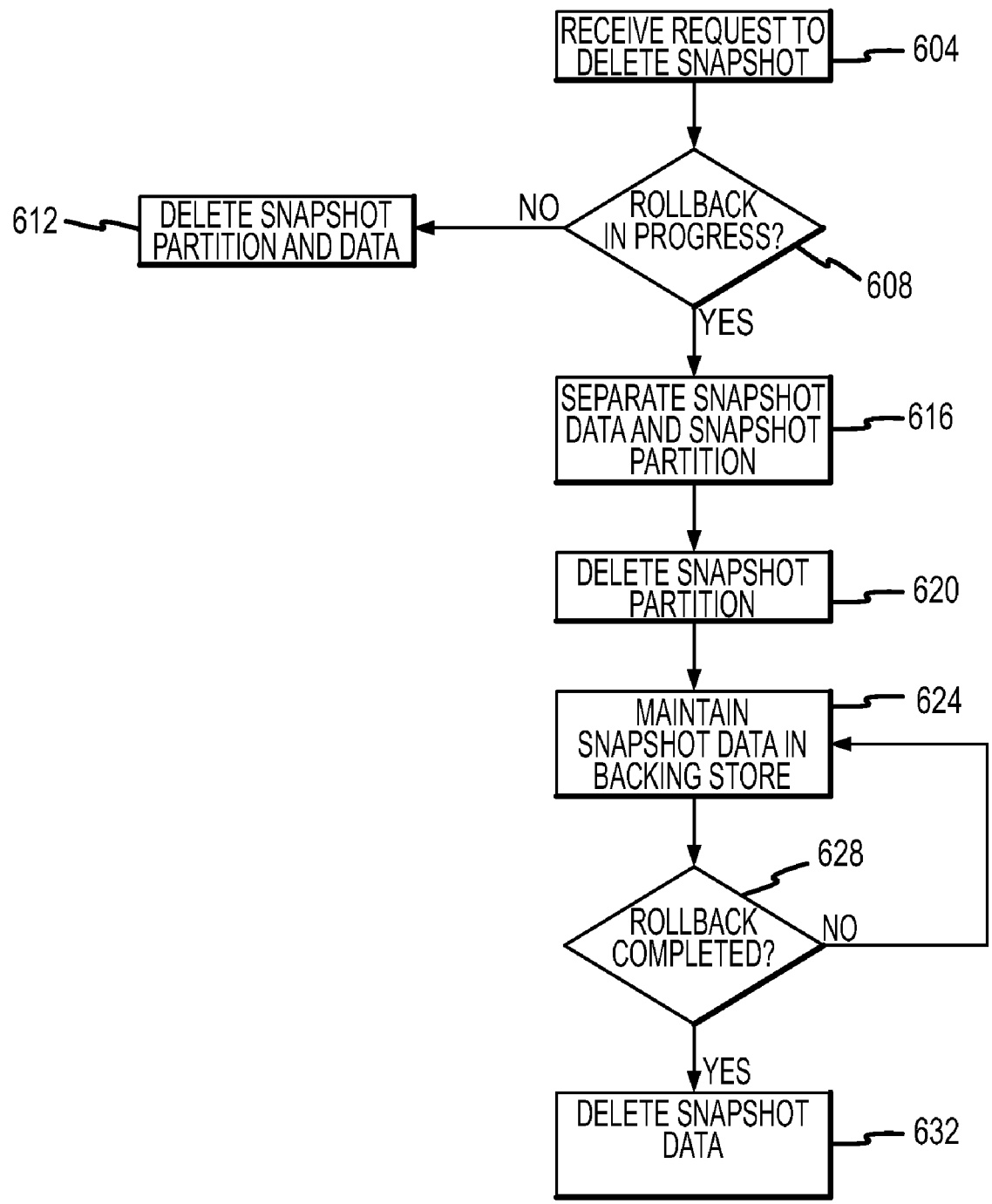
FIG. 6 is a flow chart depicting aspects of deleting a snapshot partition while rollback is in progress in accordance with embodiments of the present invention.

FIG. 6 depicts a method of deleting a snapshot 408 during rollback in accordance with at least some embodiments of the present invention. Initially, the controller 212 receives a request to delete a snapshot 408 (step 604). The request may be received by either a host computer 112 or an administrative computer 116. In response to receiving the request, the snapshot application 328 queries the rollback sub-application 332 to determine if a rollback is currently in progress (step 608). If the rollback sub-application 332 is currently inactive, meaning that no rollback is in progress, then the snapshot application 328 continues by deleting all parts of the snapshot 408 (step 612). The main parts of a snapshot 408 that are deleted when there is no rollback in progress are snapshot data and a snapshot partition.

However, if there is a rollback currently in progress, then the rollback sub-application 332 utilizes the snapshot data separation function 336 to separate the snapshot 408 into two portions (step 616). The snapshot data separation function 336 separates the snapshot 408 into snapshot data and a snapshot partition. Once separated, the snapshot application 328 deletes the snapshot partition (step 620). As noted above, the snapshot data is stored in subchunks on the storage devices 204 and comprises the raw data that may be copied to the master volume 404 during rollback. On the other hand, the snapshot partition provides the controller 212 direct access to the snapshot data. The controller 212 employs lists, metadata, and other mechanisms to access snapshot data during rollback if no snapshot partition is available for the snapshot 408. Therefore, when a request to delete the snapshot 408 is received during rollback, the snapshot application 328 can delete the snapshot partition and the rollback sub-application 332 can still access the snapshot data using other indirect access methods such as the storage device index 338.

Since the snapshot data may still be required during rollback, the snapshot data is maintained in the backing store during rollback (step 624). The snapshot application 328 monitors the progress of the rollback and continues to check if rollback is complete (step 628). The snapshot application 328 may monitor the rollback watermark to help it determine when the rollback is complete. In other embodiments, the rollback sub-application 332 may notify the snapshot application 328 when rollback is complete.

Once the rollback is completed, the snapshot application 328 continues by deleting the snapshot data (step 632). In one embodiment, the snapshot application 328 waits until the completion of the rollback until the snapshot data is deleted. In this embodiment, the entirety of the snapshot data is kept during rollback. In another embodiment, the snapshot application 328 incrementally deletes the snapshot data in synchronization with the rollback watermark. In this particular embodiment, the snapshot data is deleted once the rollback watermark indicates that a subchunk of snapshot data is no longer necessary for rollback, while the rest of the snapshot data is maintained until it has been copied to the master volume 404.

In accordance with embodiments of the present invention, the snapshot that is deleted during rollback may correspond to any snapshot 408 including the most recent snapshot at rollback point 412. However, in some embodiments, the most recent snapshot at rollback point 412 is never allocated partition space but instead only comprises snapshot data.

The foregoing discussion of the invention has been presented for purposes of illustration and description. Furthermore, the description is not intended to limit the invention to the form disclosed herein. Consequently, variations and modifications commensurate with the above teachings, within the skill and knowledge of the relevant art, are within the scope of the present invention. The embodiments described hereinabove are further intended to explain the best modes presently known of practicing the invention and to enable others skilled in the art to utilize the invention in such, or in other embodiments, and with the various modifications required by their particular application or use of the invention. It is intended that the appended claims be construed to include alternative embodiments to the extent permitted by the prior art.

What is claimed is:

1. A computer-implemented data storage volume rollback method, comprising:
    receiving, at a storage system controller, a request to rollback a master volume to a first snapshot;
    executing, by the controller, the rollback request;
    receiving, at the controller, a request to delete a second snapshot that contains data that will be copied to the master volume, wherein the second snapshot comprises at least one of a rollback snapshot and a most recent snapshot at a rollback point;
    separating, by the controller, the second snapshot into snapshot data and snapshot partition components;
    during execution of the rollback request, deleting the snapshot partition component of the second snapshot; and
    maintaining the snapshot data component of the second snapshot while the rollback of the master volume to the first snapshot is in progress, wherein the controller maintains the snapshot data component of the second snapshot by using address information of the second snapshot, wherein the address information is stored separately from the snapshot partition component of the second snapshot.

2. The method of claim 1, further comprising:
    reading data from the snapshot data component of the second snapshot via metadata associated with the first snapshot;
    copying the read data; and
    writing the copied data to the master volume.

3. The method of claim 1, further comprising:
    waiting until the rollback of the master volume to the first snapshot is completed; and
    upon completion, deleting the snapshot data component of the second snapshot.

4. The method of claim 1, wherein the first snapshot and the second snapshot are the same snapshot.

5. The method of claim 1, wherein the first snapshot corresponds to a rollback snapshot and the second snapshot corresponds to a most recent snapshot at the rollback point.

6. The method of claim 5, further comprising:
    writing on-disk master data corresponding to a master cache from the master volume to the most recent snapshot at the rollback point; and
    flushing the master volume.

7. The method of claim 1, further comprising:
    setting a rollback watermark to indicate the progress of the rollback;
    updating the rollback watermark as portions of the first snapshot are written to the master volume; and
    deleting a portion of the snapshot data component of the second snapshot after a corresponding portion of the first snapshot has been written to the master volume.

8. A device for controlling a storage system, comprising:
    controller code including:
        a rollback application configured to rollback a master volume to a rollback point, wherein the rollback point is a point in time corresponding to a rollback snapshot upon receiving a request to rollback the master volume; and
        a snapshot data separation function, wherein the snapshot data separation function, when invoked, separates a second snapshot into a first and second portion upon receiving a request to delete the snapshot such that the first portion is deleted while the rollback is occurring, and wherein the rollback application accesses the second portion via the rollback snapshot while the rollback is occurring;
        address information, wherein the address information is stored separately from the first portion of the second snapshot, wherein the rollback application accesses the second portion of the second snapshot after the first portion of the second snapshot has been deleted by using the address information; and
    a processor subsystem that executes the controller code.

9. The device of claim 8, wherein the second snapshot contains at least some data corresponding to the point in time that the rollback snapshot was taken.

10. The device of claim 8, wherein the first portion corresponds to a snapshot partition and wherein the second portion corresponds to snapshot data.

11. The device of claim 10, wherein the snapshot partition provides access to a virtual disk drive that can at least one of read and write fixed blocks of data addressed by logical addresses.

12. The device of claim 10, wherein when the first portion corresponding to the snapshot partition is deleted partition space previously used to store the snapshot partition is returned to memory where it is reallocated to a partition for at least one of a third snapshot and an additional volume.

13. The device of claim 12, wherein the partition is reallocated for the third snapshot while the rollback is occurring.

14. The device of claim 8, wherein the second snapshot comprises at least one of a rollback snapshot and a most recent snapshot at the rollback point.

15. An electronic data system, comprising:
    means for executing a rollback of a master storage volume to a point in time corresponding to a rollback snapshot;
    means for deleting a first snapshot containing at least some data associated with the point in time corresponding to the rollback snapshot, wherein the means for deleting is capable of deleting the first snapshot while rollback of the master storage volume is in progress; and
    means for accessing first snapshot data after the means for deleting deletes the first snapshot, comprising:
        means for storing first snapshot address information, wherein the means for storing stores the first snapshot address information before the means for deleting deletes the first snapshot.

16. The system of claim 15, wherein the means for deleting comprises a means for separating the first snapshot into snapshot data and a snapshot partition, and wherein the means for deleting deletes the snapshot partition while rollback of the master storage volume is in progress.

17. The system of claim 16, wherein the means for executing is operable to access the snapshot data of the first snapshot via metadata associated with the rollback snapshot.

18. The system of claim 16, wherein the snapshot partition is returned to partition memory, and wherein the partition memory previously corresponding to the first snapshot is used for a partition in a second snapshot while the rollback of the master storage volume is in progress.

19. The system of claim 16, wherein the means for deleting maintains at least some of the snapshot data of the first snapshot until the rollback of the master storage volume is finished.

20. The system of claim 16, further comprising means for tracking the progress of the rollback, wherein the means for deleting deletes the snapshot data that has already been rolled back while maintaining the snapshot data that has not been rolled back.

* * * * *